(12) United States Patent
Ikeda et al.

(10) Patent No.: US 7,363,810 B2
(45) Date of Patent: Apr. 29, 2008

(54) CORROSION RESISTANT METAL MADE THERMAL TYPE MASS FLOW RATE SENSOR AND A FLUID SUPPLY DEVICE USING THE SAME

(75) Inventors: Nobukazu Ikeda, Osaka (JP); Kaoru Hirata, Osaka (JP); Kouji Nishino, Osaka (JP); Ryousuke Dohi, Osaka (JP)

(73) Assignee: Fujikin Incorporated, Osaka-shi (JP)

( * ) Notice: Subject to any disclaimer, the term of this patent is extended or adjusted under 35 U.S.C. 154(b) by 17 days.

(21) Appl. No.: 10/553,235

(22) PCT Filed: Feb. 12, 2004

(86) PCT No.: PCT/JP2004/001519

§ 371 (c)(1),
(2), (4) Date: Oct. 14, 2005

(87) PCT Pub. No.: WO2004/092688

PCT Pub. Date: Oct. 28, 2004

(65) Prior Publication Data

US 2006/0053878 A1 Mar. 16, 2006

(30) Foreign Application Priority Data

Apr. 16, 2003 (JP) .............................. 2003-112090

(51) Int. Cl.
*G01F 1/68* (2006.01)
(52) U.S. Cl. ................. 73/204.26; 73/204.22
(58) Field of Classification Search ............. 73/204.26, 73/204.22
See application file for complete search history.

(56) References Cited

U.S. PATENT DOCUMENTS 4,548,078 A * 10/1985 Bohrer et al. ............ 73/204.22

4,616,505 A * 10/1986 Jouwsma ................. 73/204.26

(Continued)

FOREIGN PATENT DOCUMENTS

JP 11-345027 A2 12/1999

(Continued)

OTHER PUBLICATIONS

Machine EnglishTranslation of Japanese Patent No. 3,291,161, downloaded from www4.ipdl.ncipi.go.jp on Sep. 12, 2005.

*Primary Examiner*—Harshad Patel
(74) *Attorney, Agent, or Firm*—Griffin & Szipl, P.C.

(57) ABSTRACT

A corrosion resistant thermal type mass flow rate sensor, and a fluid supply device employing the sensor are provided thus allowing enhanced corrosion resistance of the thermal type mass flow rate sensor, improve responsiveness, to be achieved particle-free, and to prevent unevenness of product qualities. A thermal type mass flow rate sensor is constituted with a sensor part 1 comprising a corrosion resistant metal substrate 2 formed as a thin plate by applying electrolytic etching on the rear face side of a corrosion resistant metal material W, a thin film F forming a temperature sensor 3 and a heater 4 mounted on the rear face side of the corrosion resistant metal substrate 2, and a sensor base 13 hermetically fitted by welding to the outer periphery of the corrosion resistant metal substrate 2 of the afore-mentioned sensor part 1 fitted into a fixture groove 13*a*.

16 Claims, 14 Drawing Sheets

U.S. PATENT DOCUMENTS

| | | | | |
|---|---|---|---|---|
| 5,291,781 | A * | 3/1994 | Nagata et al. | 73/204.26 |
| 5,393,351 | A * | 2/1995 | Kinard et al. | 136/225 |
| 5,965,813 | A * | 10/1999 | Wan et al. | 73/204.26 |
| 6,062,077 | A * | 5/2000 | Azima | 73/204.27 |
| 6,125,695 | A * | 10/2000 | Alvesteffer et al. | 73/204.27 |
| 6,527,835 | B1 * | 3/2003 | Manginell et al. | 96/102 |
| 6,550,325 | B1 * | 4/2003 | Inushima et al. | 73/204.26 |
| 6,818,911 | B2 * | 11/2004 | Tamamori et al. | 250/492.22 |
| 6,981,410 | B2 * | 1/2006 | Seki et al. | 73/204.26 |
| 2004/0025585 | A1 * | 2/2004 | Seki et al. | 73/204.26 |

FOREIGN PATENT DOCUMENTS

| | | |
|---|---|---|
| JP | 2001-141540 A2 | 5/2001 |
| JP | 2001-141541 A2 | 5/2001 |
| JP | 3291161 | 3/2002 |
| JP | 2003-329697 A | 11/2003 |
| JP | 2004-085244 A | 3/2004 |
| JP | 2004317315 A * | 11/2004 |
| JP | 2005241279 A * | 9/2005 |
| WO | WO 2005080925 A1 * | 9/2005 |

* cited by examiner (a)

Temperature-Resistance Characteristics of Heater (b)

Current-Resistance Characteristics of Heater (c)

Flow Rate Characteristics of Sensor (Amplification factor: 500)

PRIOR ART

CORROSION RESISTANT METAL MADE THERMAL TYPE MASS FLOW RATE SENSOR AND A FLUID SUPPLY DEVICE USING THE SAME

FIELD OF THE INVENTION

This is a National Phase Application in the United States of International Patent application No. PCT/JP2004/001519 filed Feb. 12, 2004, which claims priority on Japanese Patent Application No. 2003-112090, filed Apr. 16, 2003. The entire disclosures of the above patent applications are hereby incorporated by reference.

The present invention is employed mainly to detect a mass flow rate in a gas supply line and the like with semiconductor manufacturing facilities, and is concerned with a corrosion resistant metal made thermal type mass flow rate sensor and a fluid supply device for which the sensor is employed, of which all the gas contacting faces are formed of corrosion resistant metals such as stainless steel (SUS316L) and the like having excellent corrosion resistance even to highly corrosive fluids, enabling to achieve to make it particle-free and leak-free.

BACKGROUND OF THE INVENTION

Conventionally, a capillary thermal type mass flow rate sensor or a silicon-made ultra-small-sized thermal type mass flow rate sensor by making use of micro-machine technologies has been widely used to measure a mass flow rate of a liquid in the technical fields such as chemical analysis equipment and the like.

The former, or a capillary thermal type mass flow rate sensor is characterized by that the sensor allows its gas contacting faces to be made of stainless steel due to the structure, thus enabling to enhance the corrosion resistance to fluids to be measured at ease.

However, the capillary thermal type mass flow rate sensor is required to be equipped with a resistance wire for a heater to be wound to heat a capillary tube, thus causing a problem that may lead to unevenness in property among the products.

Another problem may be that the response speed of a mass flow rate sensor becomes slow due to the relatively large heat capacities of the capillary tube and the resistance wire for a heater.

On the other hand, along with the development in so-called micro-machine technologies in recent years, the development and utilization of the latter, or a silicon-made ultra-small-sized thermal type mass flow rate sensor has been widely under way. It has now become popular not only in the chemical-related fields but also in the industrial fields such as an automobile industry and the like due to the reason that a silicon-made ultra-small-sized thermal type mass flow rate sensor can be manufactured under a single processing, thus reducing the unevenness in property among the products, and achieving the extremely fast response speed as a sensor by making heat capacities small by downsizing, all of which are regarded as excellent characteristics of the sensor.

However, it is noted that there exist many problems to be solved with the said silicon-made ultra-small-sized thermal type mass flow rate sensor. Among other things, corrosion resistance is one that is needed to be solved urgently. That is, a silicon-made ultra-small-sized mass flow rate sensor employs silicon to form gas contacting faces. Therefore, a fundamental difficulty is that it can be easily corroded by fluids in a halogen family and the like.

Furthermore, organic materials such as an epoxy resin, an O-ring and the like are used as sealing materials for the mass flow rate sensor, thus making the emission of particles and the occurrence of the outside leak unavoidable. Accordingly, it becomes unable that the sensor is applied for the gas supply line and the like in semiconductor manufacturing facilities.

At the same time, various technologies have been developed so far to solve difficulties the afore-mentioned silicon-made ultra-small-sized thermal type mass flow rate sensor faces.

For example, with the TOKU-KAI No.2001-141540, the TOKU-KAI No.2001-141541, there is provided a heat resistance layer $E_6$ on the outermost layer of a film E formed on the upper face of the frame D made from a silicon substrate A as shown in FIG. 18. With FIG. 18, $E_1 \sim E_3$ designate silicon oxide layers to form a film E, $E_4$ a silicon nitride layer, $E_5$ platinum, and C a lead connecting hardware.

[Patent Literature 1]
TOKU-KAI No. 2001-141540 Public Bulletin
[Patent Literature 2]
TOKU-KAI No. 2001-141541 Public Bulletin

OBJECT OF THE INVENTION

With the silicon-made ultra-small-sized mass flow rate sensor illustrated in the afore-mentioned FIG. 18, a silicon nitride $E_4$ layer formed on the lower face side of a frame D and a heat resistance layer $E_6$ comprising a silicon nitride layer to form a film E have been provided to enhance water resistance and moisture resistance. However, it is far from the fundamental solution for the problems such as the afore-mentioned corrosion and the like due to the reason that the frame D itself is formed with a silicon substrate A.

The present invention is to solve the afore-mentioned problems with the conventional mass flow rate sensor such as ① that unevenness in property among products might be caused and the response speed is low with a capillary thermal type mass flow rate sensor, and ② that the emission of particles, the occurrence of outside leaks and the like cannot be avoided with a silicon-made ultra-small-sized thermal type mass flow rate sensor in addition that it is less corrosion resistant. It is a primary object of the present invention to provide a corrosion resistant metal made thermal type mass flow rate sensor and a fluid supply device for which the sensor is employed, thus allowing to manufacture ultra-small-sized and consistent products by making use of micro-machine technologies, to achieve the excellent corrosion resistance and the fast response speed, and also to enable to make it particle-free and outside leak-less.

DISCLOSURE OF THE INVENTION

Inventors of the present invention have come to an idea, by employing micro-machine technologies, to prevent unevenness in quality among mass flow rate sensors manufactured, to enhance corrosion resistance and responsiveness, and further to achieve to make it particle-free and outside leak-less by forming two pieces of temperature detecting resistance, a heater, a lead wire to connect elements and the like required for a mass flow rate sensor by using a thin film body on the substrate made of the corrosion resistant metal such as stainless steel and the like; and manufactured trial mass flow rate sensors, and the tests were repeated on them based on the said idea.

The present invention has been created based on the afore-mentioned idea and the results on various tests. The present invention, in accordance with a first embodiment, is fundamentally so constituted that it is equipped with a sensor part 1 comprising a corrosion resistant metal substrate 2 and a thin film F forming a temperature sensor 3 and a heater 4 mounted on the rear face side of the fluid contacting surface of the said corrosion resistant metal substrate 2.

The present invention in accordance with a second embodiment, which is a modification of the first embodiment, is so made that a sensor base 13 equipped with a sensor part 1, a fluid inlet to make fluids flow in, a fluid outlet to make fluids flow out, and a body 21 equipped with a fluid passage for communication between the fluid inlet and a fluid outlet are connected, and a strain applied to the said sensor part 1 when fastening a metal gasket 27 is suppressed by relatively raising stiffness of the material immediately thereupon against the said metal gasket 27 to secure hermeticity.

The present invention in accordance with a third embodiment, which is a modification of the first embodiment or the second embodiment, is so made that a corrosion resistant metal substrate 2 is formed with thickness of less than 150 μm.

The present invention in accordance with a fourth embodiment, which is a modification of the first embodiment or the second embodiment, is so made that a sensor base 13 equipped with a sensor part 1 installed to secure hermeticity and a corrosion resistant metal substrate 2 are fastened hermetically by welding.

The present invention in accordance with a fifth embodiment, which is a modification of the first embodiment, the second embodiment, the third embodiment or the fourth embodiment, is so made that a thin film F is constituted with an insulation film 5 formed on the rear face of the fluid contacting face of the corrosion resistant metal substrate 2, a metal film M to form a temperature sensor 3 and a heater 4 formed thereupon, a protection film 6 to cover the insulation film 5 and the metal film M.

The present invention in accordance with a sixth embodiment is so made that a corrosion resistant metal made thermal type mass flow rate sensor of one or more of the first embodiment, the second embodiment, the third embodiment, the fourth embodiment and the fifth embodiment, inclusive, is mounted on a fluid controller, to check the flow rate appropriately when fluids are controlled.

In accordance with the present invention, a mass flow rate sensor is manufactured by applying micro-machine technologies as in the case of the conventional silicon-made ultra-small-sized mass flow rate sensor, thus enabling to reduce the unevenness in quality among the products to a minimum. In addition, the corrosion resistant metal substrate used for a sensor substrate (for example, the SUS316L-made substrate) is processed to make it a thin plate with thickness of 30~80 μm by electrolytic etching, and a resistance wire and the like are made to be thin films, to make the heat capacity of the sensor part extremely small, thus increasing the response speed of the sensor remarkably.

Furthermore, all the gas contacting faces are constituted of a corrosion resistant metal, and a sensor part and a sensor base are assembled by welding, and a metal gasket sealing is employed to mount a valve body and the like, thus enabling to achieve to make it corrosion-free, particle-free and outside-leak-free.

LIST OF REFERENCE CHARACTERS AND NUMERALS

Figure 1:
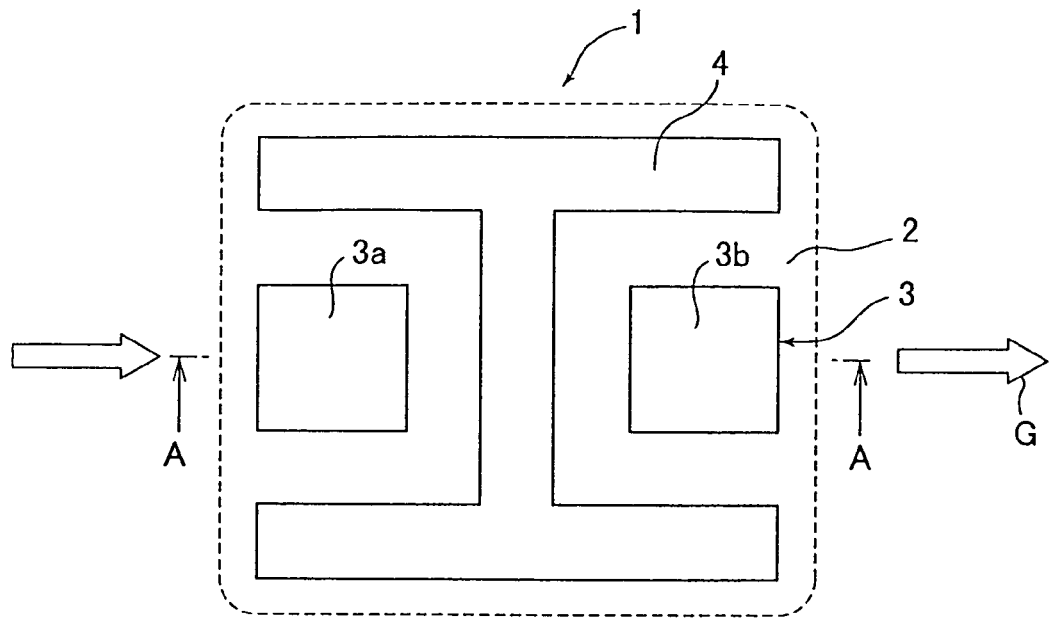
FIG. 1 is a plan schematic view of the sensor part of a corrosion resistant metal made thermal type mass flow rate sensor according to the present invention.

S a corrosion resistant metal made mass flow rate sensor
F a thin film
M a metal film
W a corrosion resistant metal material
G a gas to be measured
1 a sensor part
2 a corrosion resistant metal substrate
3 a temperature sensor
3a, 3b temperature detecting resistances
4 a heater
5 an insulation film
6 a protection film
7 an electrode insertion hole
8 a combined photo-mask pattern
9 a photo-mask pattern to form a temperature detecting resistance and a heater
10 a photo-mask pattern to form a lead hole
11 a photo-mask pattern (a resist pattern) for etching the rear face side
11a a groove part
11b a thin substrate part
12a, 12b negative resists
13 a sensor base
13b a fixture groove
14 a heater driving circuit
15 an offset adjustment circuit (for the coarse adjustment)
16 an offset adjustment circuit (for the fine adjustment)
17 a gain adjustment circuit for the temperature detecting resistance
18 a differential amplifying circuit
19 an output terminal
20 a joint part
21 a body
22 a sensor base presser
23 a wiring substrate presser
24 a wiring substrate
25,26 guide pins
27 a metal gasket
28 a rubber sheet
29 a lead pin
30 a lead wire (a gold wire)
31 a body
32 a pressure detector
33 a control valve
34 a piezo-electric valve driving device
35 an orifice
36 a filter

BEST MODE FOR CARRYING OUT THE INVENTION

The embodiment in accordance with the present invention is described hereunder with reference to the drawings.

Figure 2:
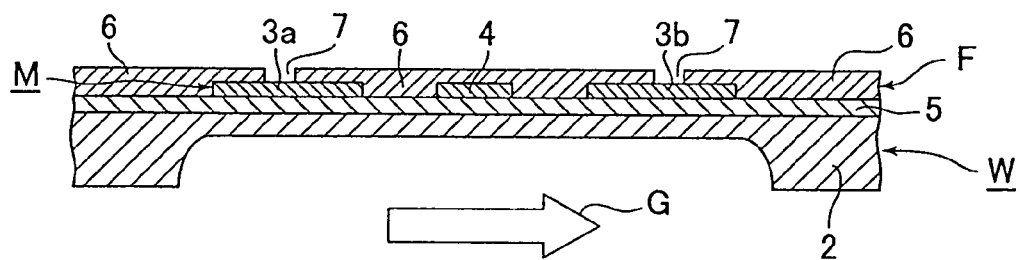
FIG. 2 is a cross-sectional schematic view taken line A-A of FIG. 1.

FIG. 1 is a plan schematic view of the sensor part 1 which is an essential part of a corrosion resistant metal made thermal type mass flow rate sensor according to the present invention. FIG. 2 is a cross-sectional schematic view taken on line A-A of FIG. 1.

The sensor part 1 comprises a thin heat resistant metal substrate 2, an insulation film 5 formed on the upper face of the substrate 2, a temperature sensor 3 and a heater 4 formed on the upper face of the insulation film 5, and a protection film 6 formed on the upper faces of the temperature sensor 3, a heater and the like. That is, the sensor part 1 includes outer peripheral part 1a, which forms the sensor part 1 of the corrosion resistant metal material W with thickness of 120~180 µm (or a heat resistant metal substrate 2), and central part 1b, which is made to be a thin plate with thickness of approximately 30~80 µm, as described later, by removing a part of the rear face side of the material W by the method of an electrolytic etching processing (See FIG. 5).

A thin film F is formed on the upper face side of the heat resistant metal substrate 2 with an insulation film 5, a metal film M which forms a temperature sensor 3, a heater 4, and an electric conductive lead part (not illustrated), and a protection film 6.

Furthermore, an electrode insertion hole 7 with an appropriate size is formed on the afore-mentioned protection film by the etching processing.

Figure 3:
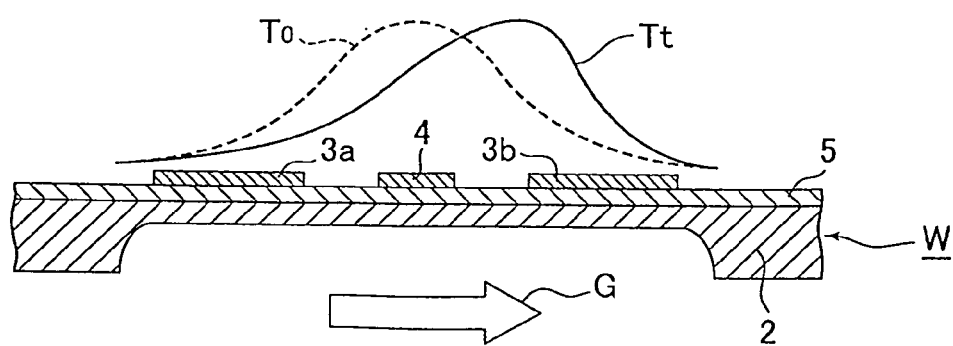
FIG. 3 is an explanatory drawing of the operating principle of a corrosion resistant metal made thermal type mass flow rate sensor according to the present invention.

Thus, a gas G to be measured flows in the direction of the arrow along the corrosion resistant metal substrate 2 on the rear face side of the sensor part 1. When this happens, some of the heat quantity the gas G possesses move to the corrosion resistant metal substrate 2, thus resulting in that the temperature distribution Tt of the heat resistant metal substrate 2 shifts from the temperature distribution To where there is no flow of the gas G to the temperature distribution Tt as shown in FIG. 3.

As seen above, changes in the temperature distribution of a corrosion resistant metal substrate 2 caused by the flow of the gas G are presented as changes in the voltage values at the both ends of the temperature detecting resistances 3a, 3b through the mediation of changes in the resistance values of the temperature detecting resistances 31, 3b which form a temperature sensor 3. Thus, a mass flow rate of the gas G can be known by detecting the changes in the voltage values as a differential output.

The above stated operating principle of a thermal type mass flow rate sensor is identical with that of a publicly known silicon-made thermal type mass flow rate sensor. Therefore, the explanation in detail is omitted here.

Referring to FIG. 1 and FIG. 2, a less-than-approximately-150 µm thick thin-plate-shaped metal plate having corrosion resistance is most suited for a corrosion resistant metal material W which forms the afore-mentioned sensor part 1. With the embodiment, a stainless steel plate (SUS316L) with thickness off 150 µm is used.

The part which forms a sensor part 1 of the said corrosion resistant metal material W, that is, a corrosion resistant metal substrate 2 (encircled by a dotted line) is made to be thinner by an etching processing as explained later, thus substantially making it approximately 30~60 µm thick.

As described later, the afore-mentioned insulation film 5 is an oxidized film with thickness of 1.2 µm~1.8 µm formed by the so-called CVD method. With the embodiment, a 1.5 µm thick $SiO_2$ film formed by the CVD (chemical Vapor Deposition) method is used for the insulation film 5.

The afore-mentioned temperature detecting resistance 3 and heater 4 are made from a metal film M formed by using the mask pattern for the flow rate sensor (not illustrated) on the afore-mentioned insulation film 5. With the embodiment, a temperature detecting resistance 3, a heater 4 and the like are made from a metal film M formed by a Cr/Pt/Cr film (with thickness of 10/100/10 µm respectively) being laminated in order by the vapor deposition method.

The afore-mentioned protection film 6 is a film body covering the upper part of a temperature detecting resistance 3, a heater 4 and the like. With the embodiment, the 0.4~0.71 µm thick $SiO_2$ film formed by the CVD method is used.

The said protection film 6 is provided with an electrode insertion hole 7 suitably shaped by the plasma etching method, to draw out an electrode rod and the like through the said electrode insertion hole 7.

The rear face side of a corrosion resistant metal substrate 2 which forms a sensor part 1 is finished with thickness of 30~80 μm by applying an electrolytic etching to the corrosion resistant metal material W as described later.

A sensor part 1 is eventually separated from a corrosion resistant metal material W by the method of a so-called through-etching processing. As described later, the separated sensor part 1 is hermetically fixed to a corrosion resistant metal made flow rate sensor base 13 by the laser welding or the like, to constitute a corrosion resistant metal made thermal type mass flow rate sensor S according to the present invention.

Next, the manufacturing and working process of the afore-mentioned sensor part 1 is described.

Figure 4:
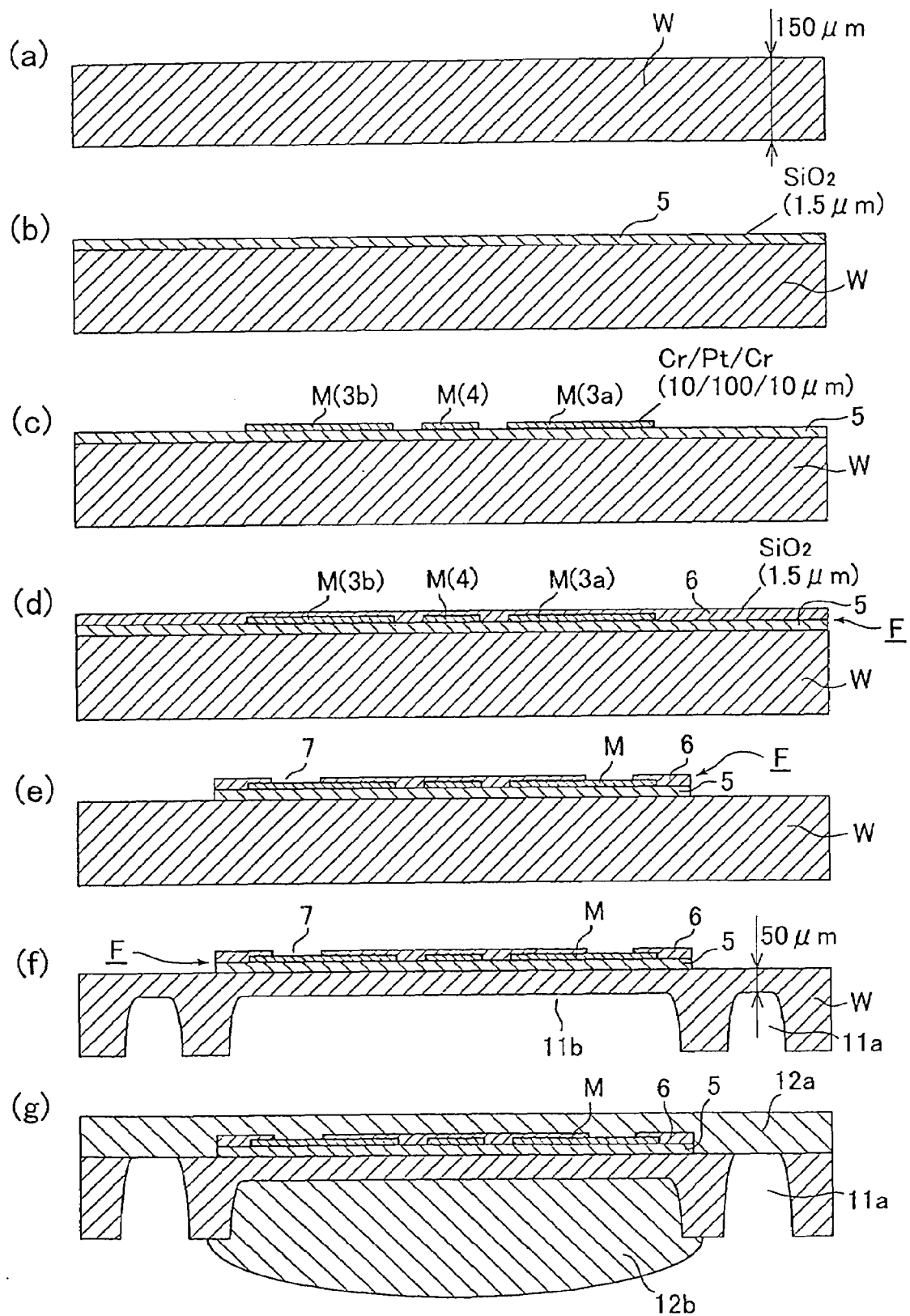
FIG. 4 is explanatory drawings of the manufacturing process of a sensor part, where (a) is a preparation process of the SUS316L wafer, (b) is a formation process of an insulation film 5, (c) is a formation process of a Cr/Pt/Cr film (a metal film M), (d) is a formation process of a protection film 6, (e) is a formation process of an electrode insertion hole 7, (f) is an etching process on the rear side of the SUS316L wafer, and (g) is a separation etching process on the sensor part.

FIG. 4 is an explanatory drawing of the manufacturing process of a sensor part 1 according to the present invention.

First, a stainless steel made thin plat (SUS316L) with appropriate dimensions, for example, of the diameter of 70 mm φ~150 mm φ, the thickness of 130~180 μm is prepared for a corrosion resistant metal material W (FIG. 4(a)). There is no need to say that a thin metal plate (for example, an austenitic steel plate made of a Cr—Ni alloy) other than the thin stainless steel plate can be employed for the corrosion resistant metal material W.

Then, a $SiO_2$ film (an insulation film) 5 with thickness of approximately 1.51 μm is formed on the outer rear face of the afore-mentioned stainless steel made thin plate (hereinafter called a SUS316L wafer) by employing a plasma CVD device (the Plasma-Enhanced Chemical Vapor Deposition Device) for which TEOS (Tetra-Ethoxy-Silaue) is used (FIG. 4(b)).

Figure 6:
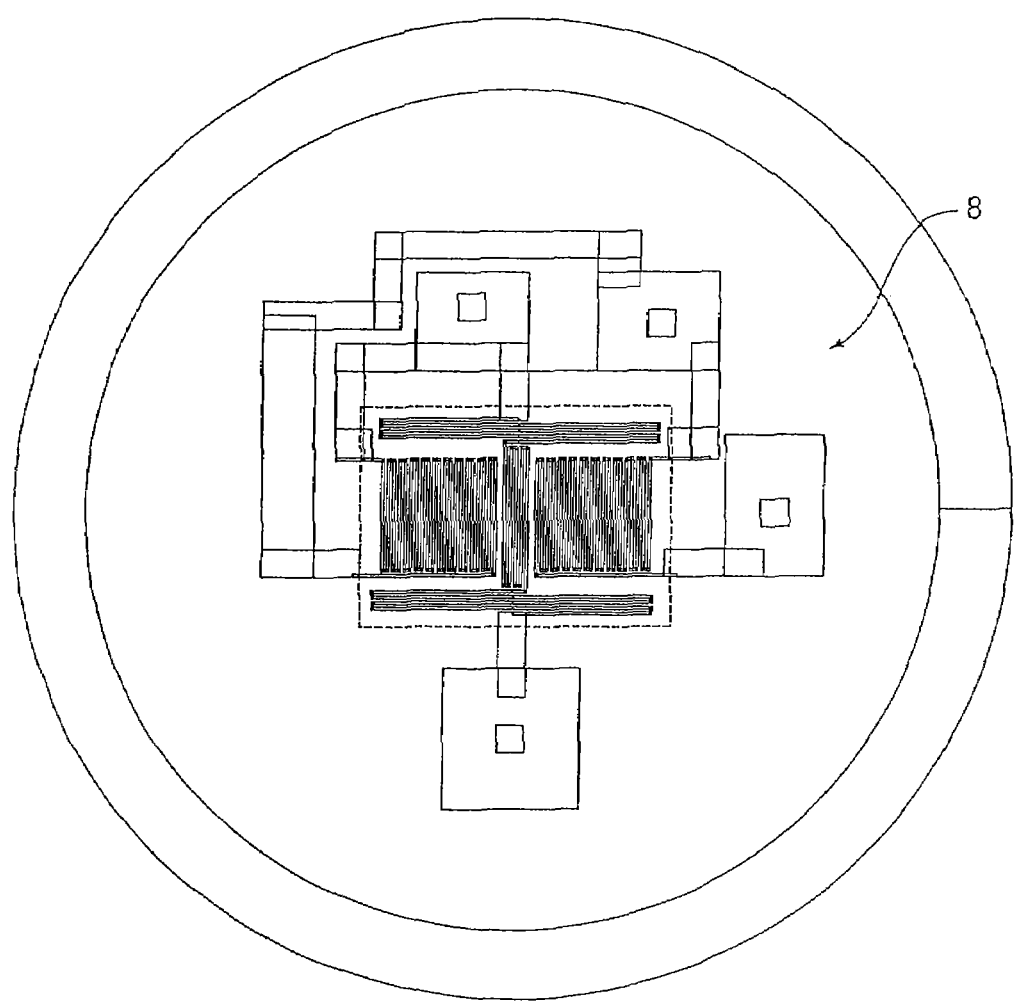
FIG. 6 illustrates a photo-mask pattern to be used for manufacturing a sensor part, and shows a state of a pre-mask pattern being overlaid.
Figure 7:
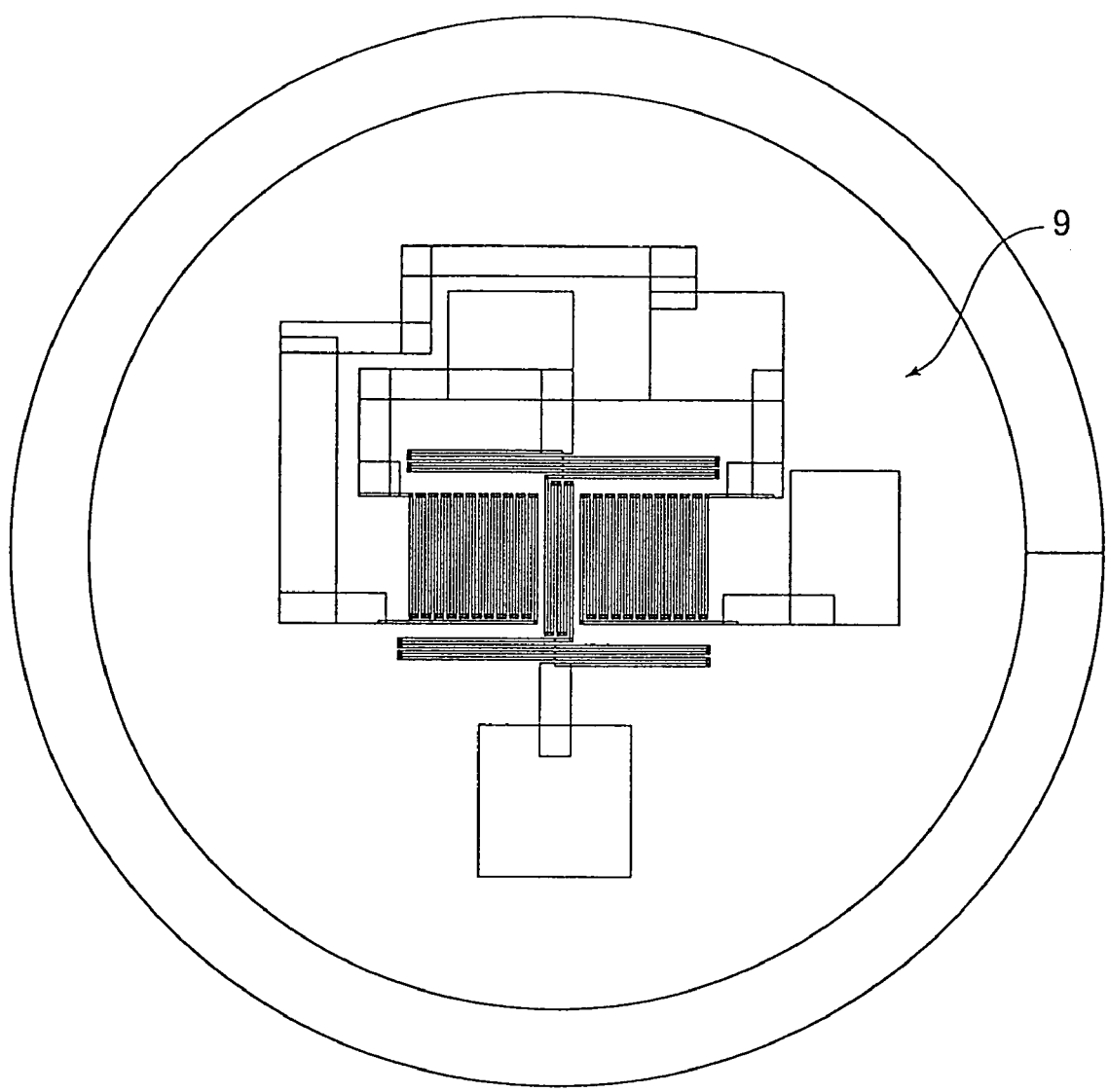
FIG. 7 illustrates a photo-mask pattern to be used for manufacturing a sensor part, and shows what is used for the process in FIG. 4(*c*).

And, there are formed patterns of temperature detecting resistances 3a, 3b, a heater 4 and the like made from a metal film M formed by a Cr/Pt/Cr film (with thickness of 10/100/10 μm respectively) by employing an electronic beam heating type vapor deposition device and photo-mask patterns 9 illustrated in FIG. 7 on the afore-mentioned $SiO_2$ film (FIG. 4(c)). FIG. 6 illustrates a photo-mask pattern 8 in a state of a photo-mask pattern 9 being combined with a photo-mask pattern 10 to form an electrode insertion hole 7 as described later.

Then, a $SiO_2$ film (a protection film) 6 with thickness of approximately 0.5 μm is formed on the temperature detecting resistances 3a, 3b and the heater 4 which form a temperature sensor 3 formed in the process of the afore-mentioned FIG. 4(c) by employing a plasma CVD for which the afore-mentioned TESO is used (FIG. 4(d)).

Figure 8:
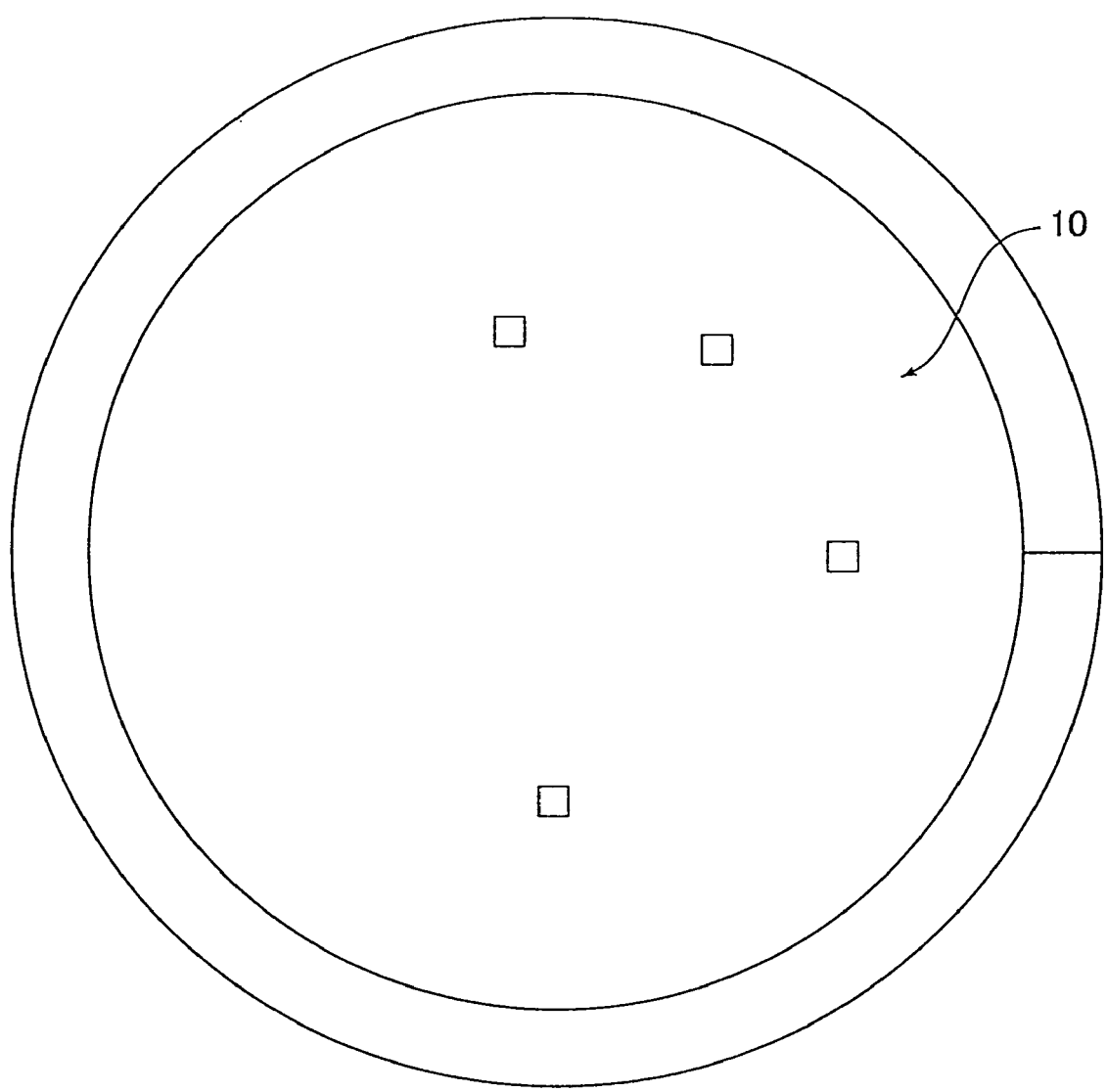
FIG. 8 illustrates a photo-mask pattern to be used for manufacturing a sensor part, and shows what is used for the process in FIG. 4(*e*).

After that, there is made a hole with a bore of 200 μm (an electrode insertion hole 7) to draw out an electrode on the afore-mentioned protection film 6 for a temperature detecting resistance 3 and a heater 4 by employing a photo-mask pattern 10 to form an electrode insertion hole illustrated in FIG. 8 with a plasma etching device for which $CF_4$ gas is used (FIG. 4(e)).

Due to the reason that the SUS316L material and Cr have a high tolerance to plasma by the $CF_4$ gas, the etching in progress stops automatically upon completion of the etching of a $SiO_2$ film 6. Therefore, there is no risk for a so-called over-etching.

Figure 9:
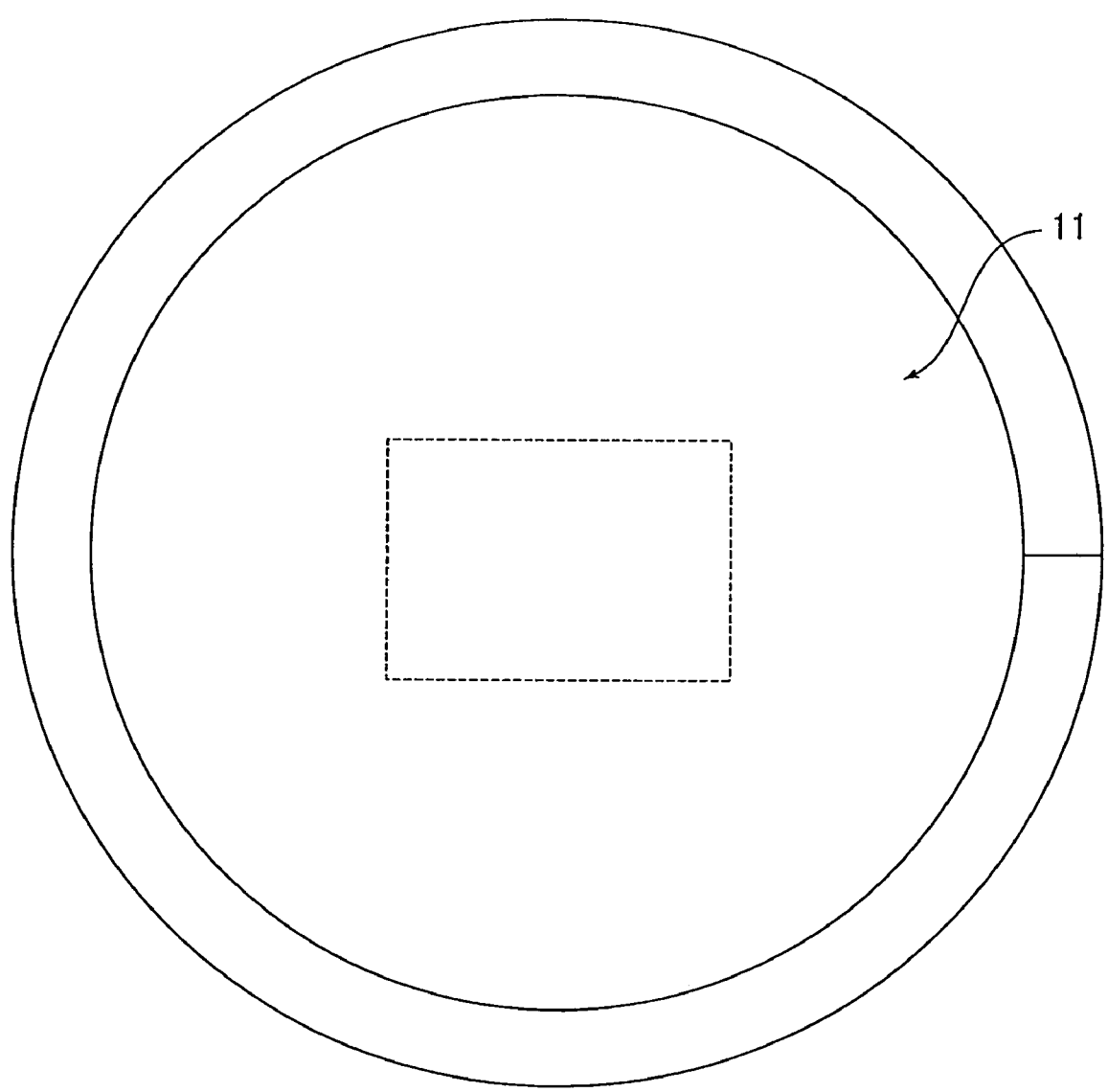
FIG. 9 illustrates a photo-mask pattern to be used for manufacturing a sensor part, and shows what is used for the process in FIG. 4(*f*).

Upon completion of the afore-mentioned processes on the top face of a corrosion resistant metal material W (the SUS316L wafer), a resist pattern is formed on the rear face side using a photo-mask pattern 11 illustrated in FIG. 9, and an etching processing is performed on the rear face side of the material W to make the thickness become approximately 50 μm by an electrolytic etching (FIG. 4(f)).

A part 11a shown in FIG. 4(f) is a groove part to separate the sensor part 1 from the material W. 11b is a thin substrate part made thin by the etching processing.

Lastly, a negative resist 12a (a spin coat method) and a negative resist 12b (a dip coat method) are coated on the rear face side of the corrosion resistant metal substrate 2 whereon the afore-mentioned films were formed and the thin substrate part 11b on the rear face side. And then, the thin substrate part 11b (with thickness of approximately 50 μm) of the groove part 11a is penetrated circularly by applying an etching treatment with ferric chloride solution ($FeCl_3$—40wt %) so that the sensor part 1 is separated from the material W.

Figure 5:
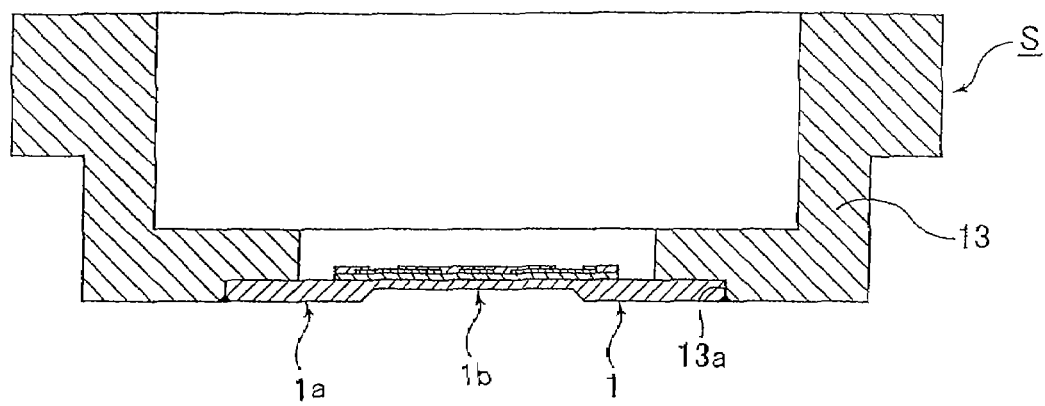
FIG. 5 is a sectional schematic view to illustrate an example of a corrosion resistant metal made thermal type mass flow rate sensor.

After removing the resists 12a and 12b, the circle-shaped sensor part 1 separated from the material W is fitted flush into the flat fitting groove 13a of the sensor base 13 formed in the shape shown in FIG. 5, and fixed hermetically to the sensor base 13 by laser welding on the outer peripheral part 1a, thus a corrosion resistant metal made thermal type mass flow rate sensor S according to the present invention being constituted.

With the etching processes shown in the afore-mentioned FIG. 4(f), a mixed solution of the sulfuric acid and methyl alcohol is used for the electrolytic solution, and a photo resist is used for the mask material to etch the specified parts on the rear face side of the material W.

Figure 10:
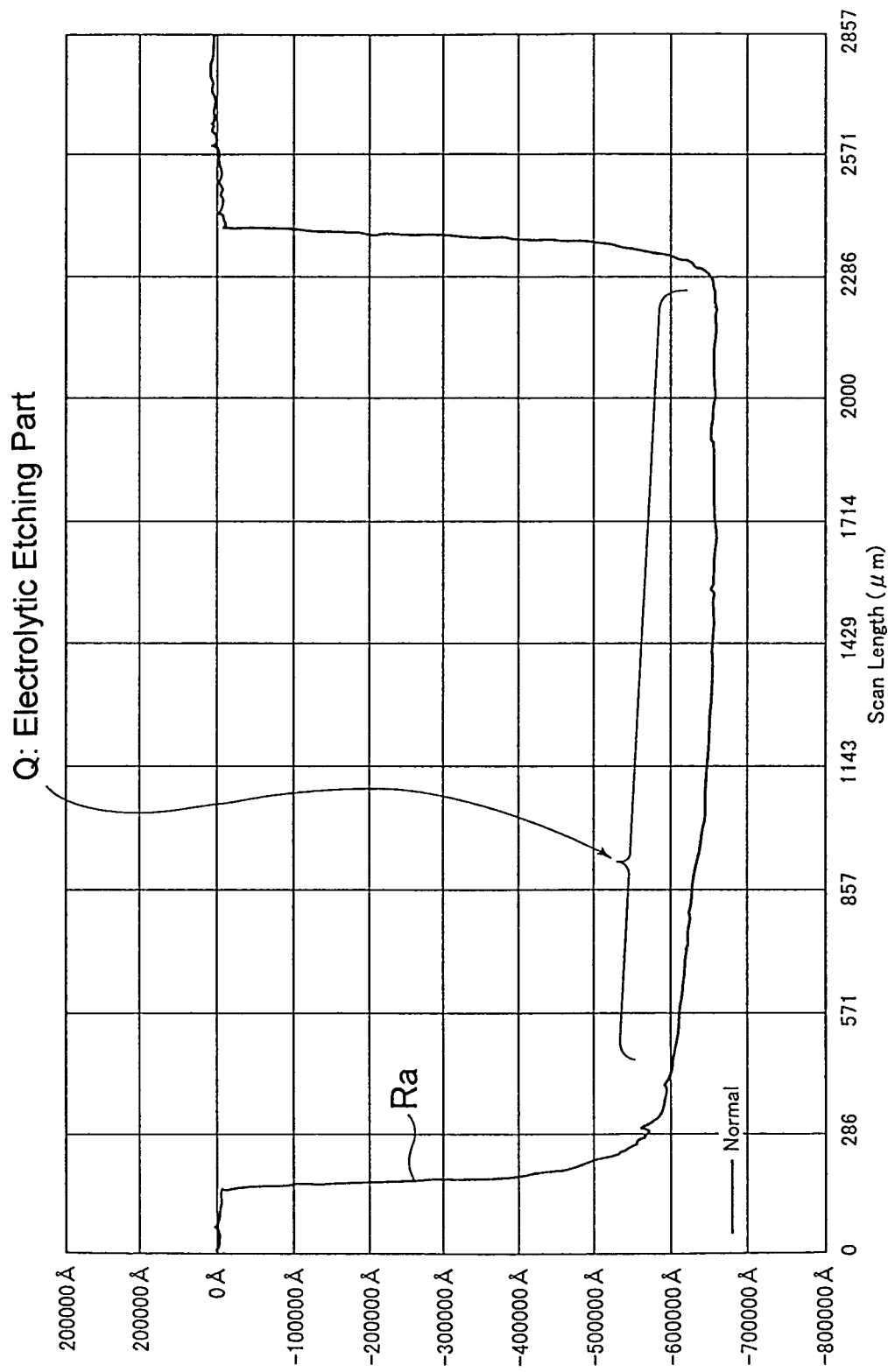
FIG. 10 illustrates the surface coarseness in the event that electrolytic etching is performed to the SUS316L-made substrate.

The coarseness of the rear face after an electrolytic etching was performed on the afore-mentioned SUS316L-made substrate 2 is found to be less than Ra 0.1 μm as shown in FIG. 10. This indicates that there exists no local over-etching.

Namely, it is found that an electrolytic etching method is an extremely effective one to conduct etching on the SUS316L due to the reason that a gas contacting part in the gas piping system for the semiconductor process is needed to be particle-free and corrosion-free.

Figure 11:
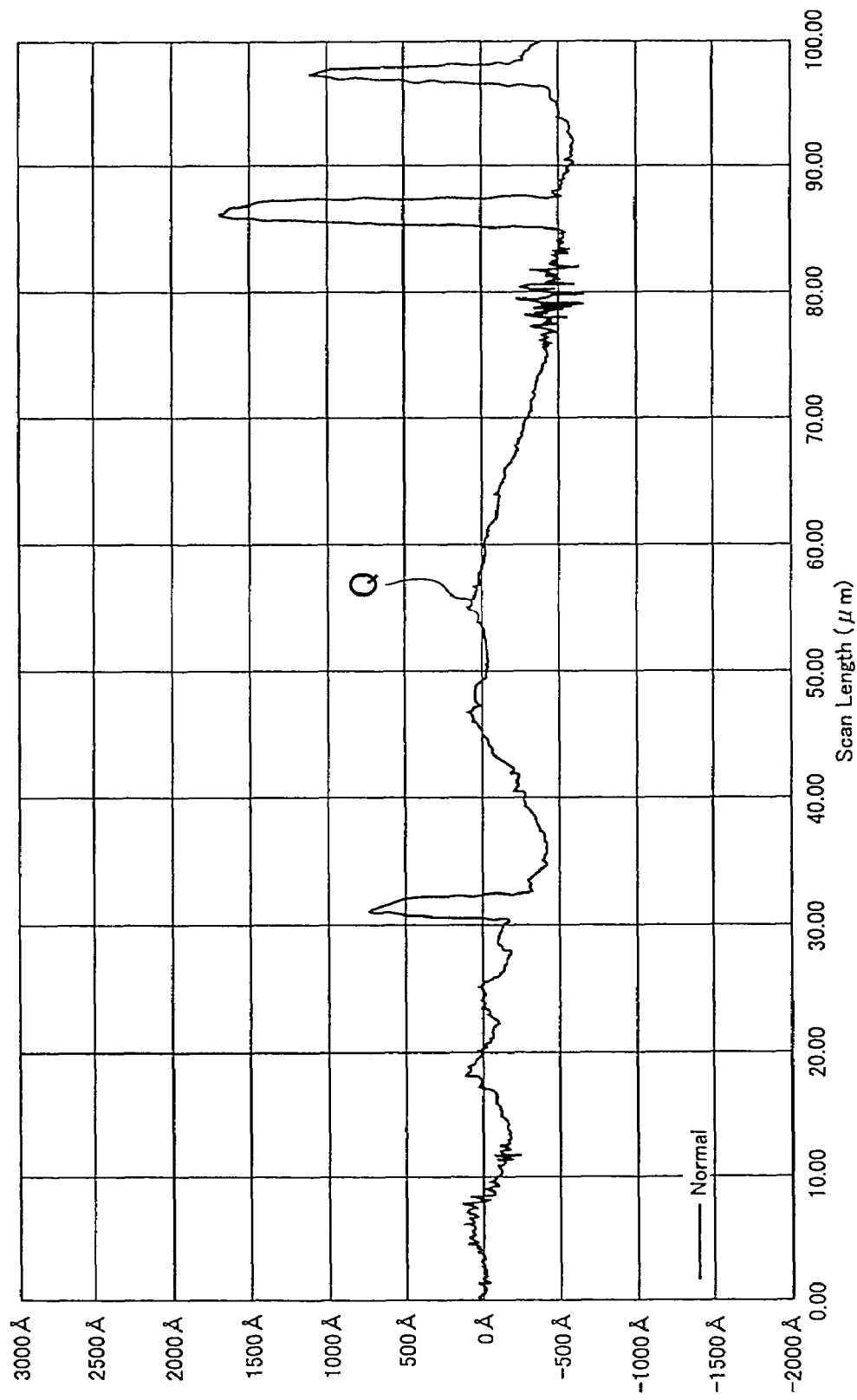
FIG. 11 is a partially enlarged view of an electrolytic etching part Q in FIG. 7.

A part Q in FIG. 10 shows the afore-mentioned electrolytic etching part, and FIG. 11 is an enlarged view of the electrolytic etching part Q.

Figure 12:
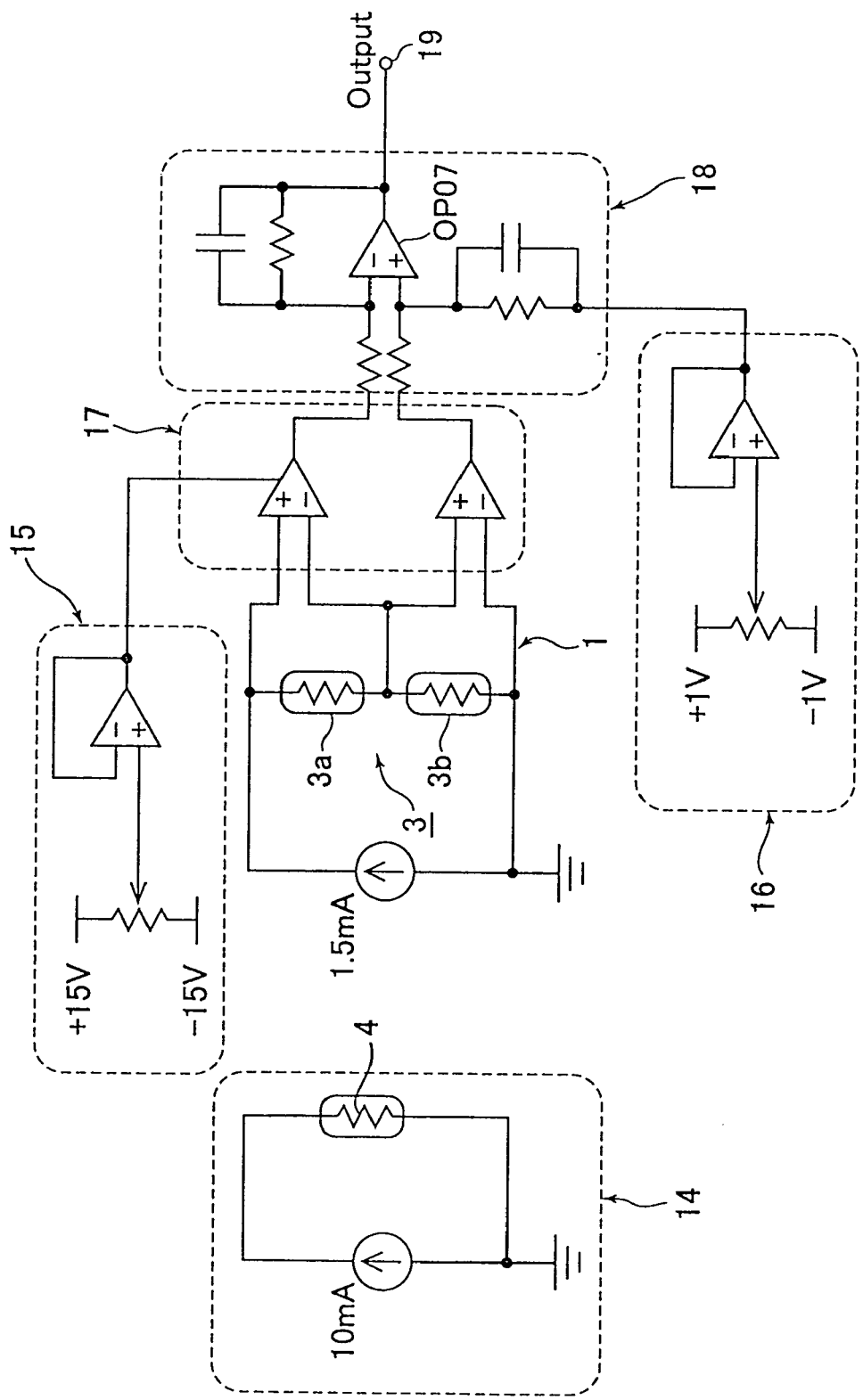
FIG. 12 is a signal detection circuit diagram of a mass flow rate sensor according to the present invention.

FIG. 12 shows a signal detection circuit diagram of a mass flow rate sensor according to the present invention shown in the afore-mentioned FIG. 5. The said signal detection circuit comprises a sensor part 1, a heater driving circuit 14, an offset adjusting circuit (for a coarse adjustment) 15, an offset adjusting circuit (for a fine adjustment) 16, a gain adjusting circuit for a temperature detecting resistance 17, a differential amplifying circuit 18 and the like. With FIG. 12, 3a and 3b are temperature detecting resistances, and 19 is an output terminal.

Referring to FIG. 12, a sensor part 1 is heated when a heater driving circuit 14 starts operating. Resistance values change with the temperature changes of the upstream side temperature detecting resistance 3a and the downstream side temperature detecting resistance 3b which form the temperature sensor 3 of the sensor part 1 when the gas G to be measured flows through. The changes are inputted as the changes in the output voltage to the differential amplifying circuit 18 through the gain adjusting circuit 17. The output difference between the two values is outputted to the output terminal 19 by way of an operation amplifier 0707.

A corrosion resistant metal substrate 2 which forms the sensor part 1 according to the present invention is made to be a thin film by electrolytic etching. Therefore, there is a possibility that the sensor part 1 is distorted by the gas pressure when the gas G flows, thus resulting in that the resistance values of the temperature detecting resistances 3a, 3b of the temperature sensor 3 might change.

For this reason, in the event that an usual resistant bridge circuit is employed, there is caused a problem that the output of a sensor part 1 changes with the occurrence of distortion. However, with a signal detecting circuit according to the present invention, it is so constituted that the rates of amplification of the voltage values outputted from the upstream side temperature detecting resistance 3a and the downstream side temperature detecting resistance 3b are independently adjusted by the offset adjusting circuit 15, and the input values to the differential amplifying circuit 18 are further fine-adjusted by the offset adjusting circuit 16. Therefore, the changes in the output voltage values of the temperature detecting resistances 3a, 3b caused by application of the gas pressure are cancelled by the adjustment of the amplification rates.

As the result, the output changes of the sensor part 1 caused by the gas pressure can be completely suppressed, thus allowing the detection of the mass flow rate with the high degree of accuracy.

Figure 13:
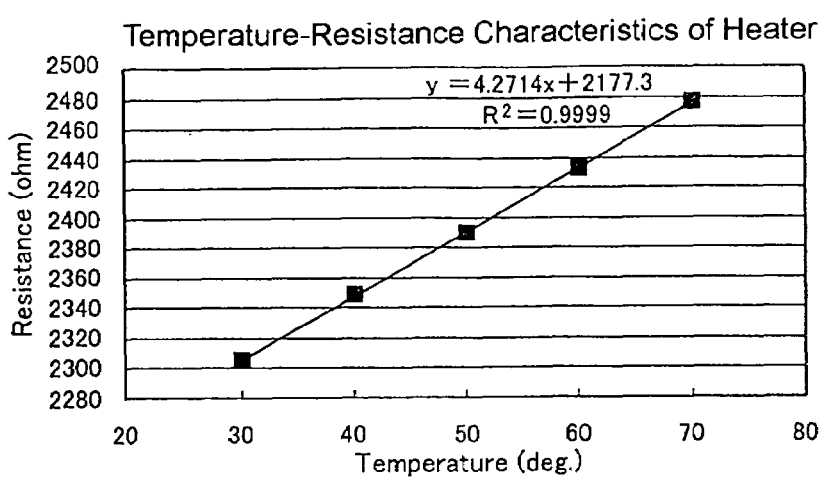
FIG. 13 is a diagram to illustrate various characteristics of a sensor part according to the present invention, where (a) shows the relationship between the heat temperature and the resistance value of the temperature detecting resistance, (b) shows the relationship between the heat current and the resistance value of the temperature detecting resistance, and (c) shows the relationship between the gas flow rate and the sensor output.
Figure 13:
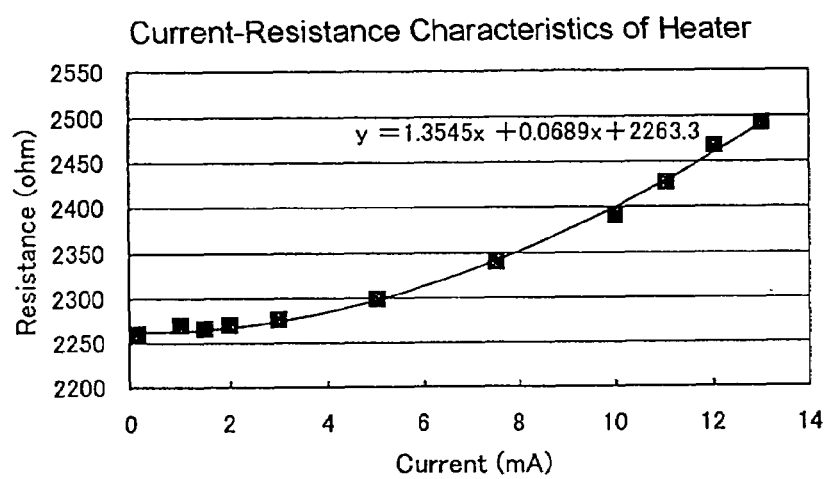
Figure 13:
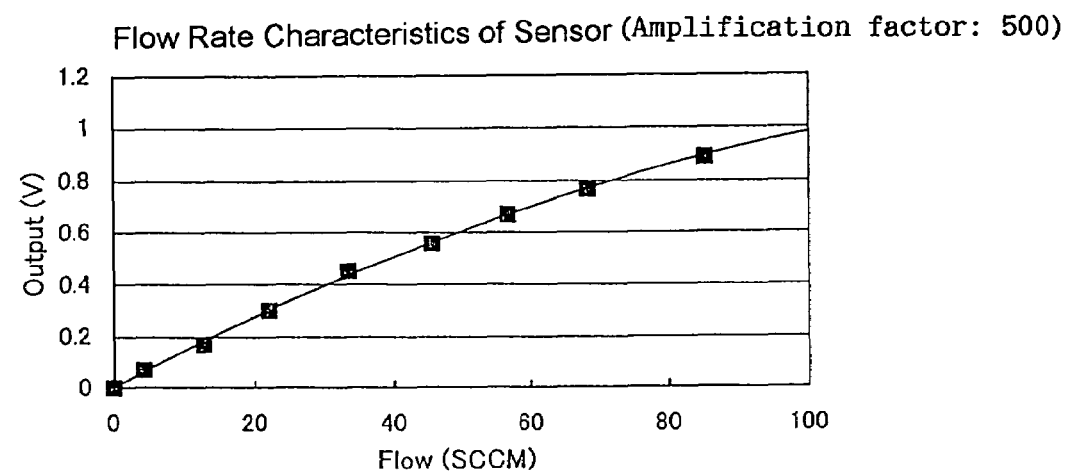

FIG. 13 is a diagram to illustrate the characteristics of a mass flow rate sensor S according to the present invention. FIG. 13(a) shows the relationship between the temperatures of a heater 4 and the resistance values. FIG. 13(b) shows the relationship between the current values of a heater 1 and the resistance values, and FIG. 13(c) shows the relationship between the gas flow rate (SCCM) and the detection output values (v).

The resistance value of the heater 4 of a sensor part 1 used for the measurement of various characteristics in FIG. 13 was approximately 2.4 kΩ and the resistance values of the temperature detecting resistances 3a, 3b were 2.0 kΩ (both carrying the same values). The heater 4 was fed with a current of 10 mA, and the temperature detecting resistances 3a, 3b were fed with a current of 1.2 mA.

When a gas flow rate was made to change in the range of 0~100 SCCM, the changes in the output value of the sensor part 1 was approximately 1.0V (note: the output value was amplified by 500 times by the OP amplifier).

Figure 15:
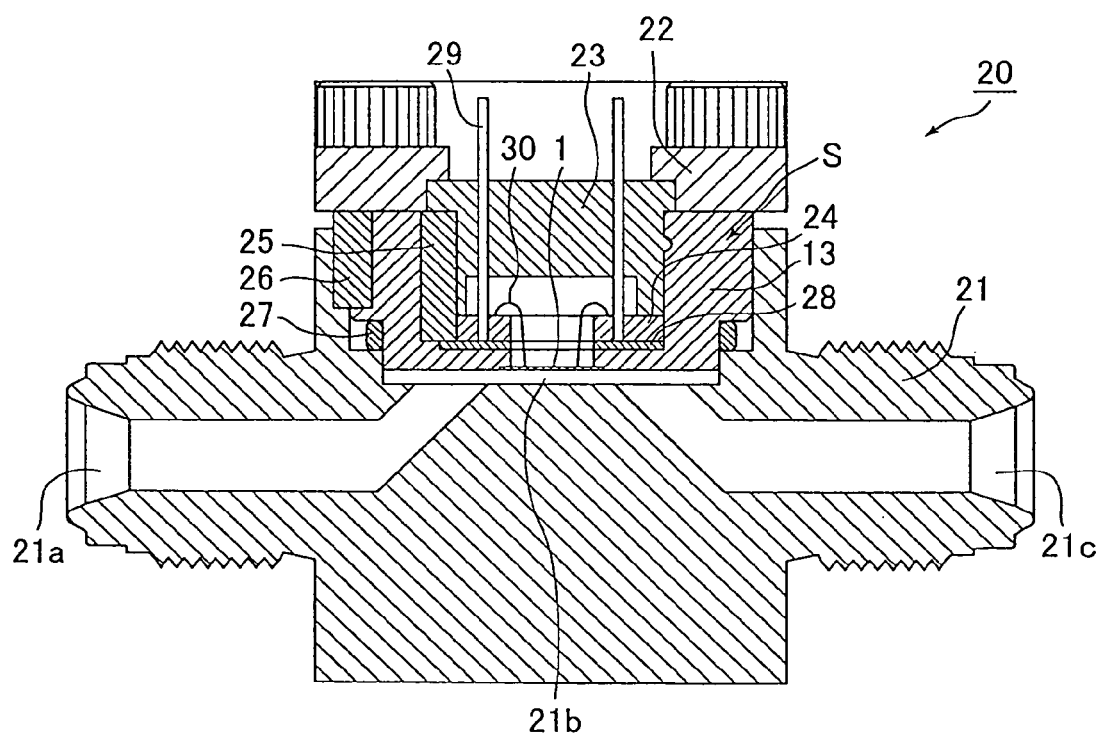
FIG. 15 is a sectional view to illustrate an example of the assembly drawing of a mass flow rate sensor according to the present invention.

Furthermore, the output value of the sensor part 1 depends on the interstice (a flow passage height) between the sensor base 13 of a mass flow rate sensor S and the fluid passage as shown in FIG. 15 to be described later. Therefore, the possible measuring range of the flow rate can be appropriately changed by adjusting the afore-mentioned flow rate height.

Figure 14:
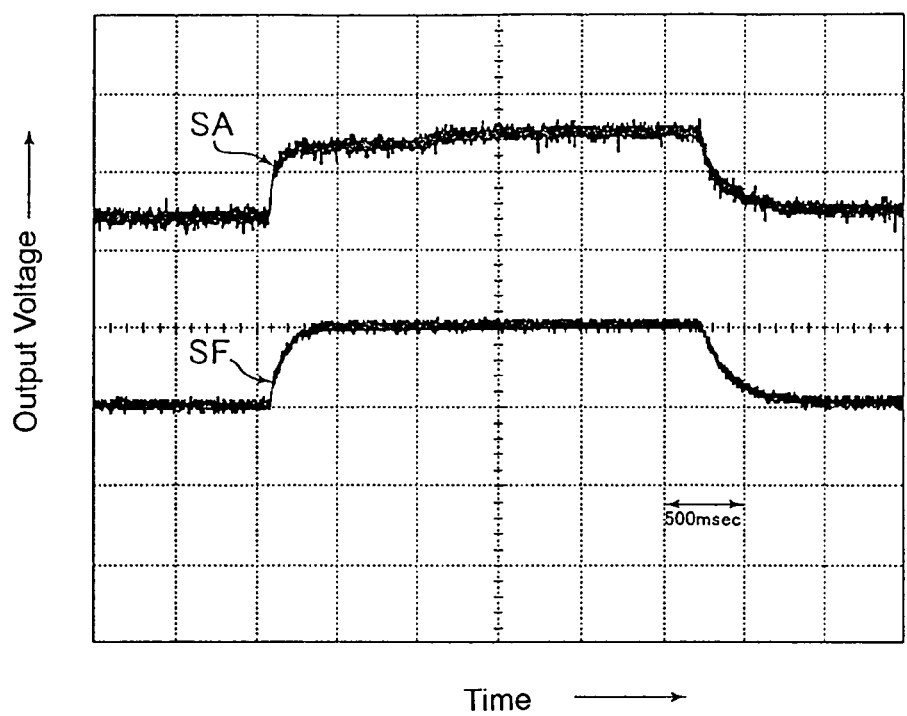
FIG. 14 is a diagram to illustrate an example of the flow rate response characteristics of a mass flow rate sensor according to the present invention.

FIG. 14 illustrate an example of the flow rate characteristics of the mass flow rate sensor S according to the present invention, and also illustrates the characteristics in the event that a gas flow rate is set at 0~100 SCCM. With FIG. 14, the curve SA illustrates the flow rate response characteristics of the mass flow rate sensor S according to the present invention, and a graduation on the lateral axis indicates 500 msec.

The curve SF illustrates the flow rate response characteristics of the mass flow rate sensor with the conventional pressure type flow rate control device under the same conditions.

FIG. 15 illustrates an example of the fluid supplying device equipped with a mass flow rate sensor S according to the present invention, and also illustrates a state o the mass flow rate sensor S being fixed to the joint part 20 mounted on the gas passage. With FIG. 15, 21 designates a body of the joint part 20, 22 a sensor base presser, 23 a wiring substrate, 24 a wiring substrate presser, 25 a guide pin, 26 a guide pin, 27 a metal gasket, 28 a rubber sheet, 29 a lead pin, and 30 a lead wire (a gold wire).

The afore-mentioned guide pins 26,27 are used for the positioning at the time when a mass flow rate sensor S is fitted into a body 21. The space between the sensor base 13 and the body 21 is hermetically secured by the metal gasket 27.

The mass flow rate of the gas G flowed in through a fluid inlet 21a is detected by the sensor part 1 while the gas G is passing through the inside of the flow passage 21b, and the gas G flows out through the fluid outlet 21c toward the outside.

With the present invention, a gas G to be measured flow while the gas G is brought into contact with the SUS316L-made substrate 2. Therefore, unlike the case with the conventional silicon-made substrate, there is no chance at all that the substrate 2 is corroded with the gas G.

Figure 16:
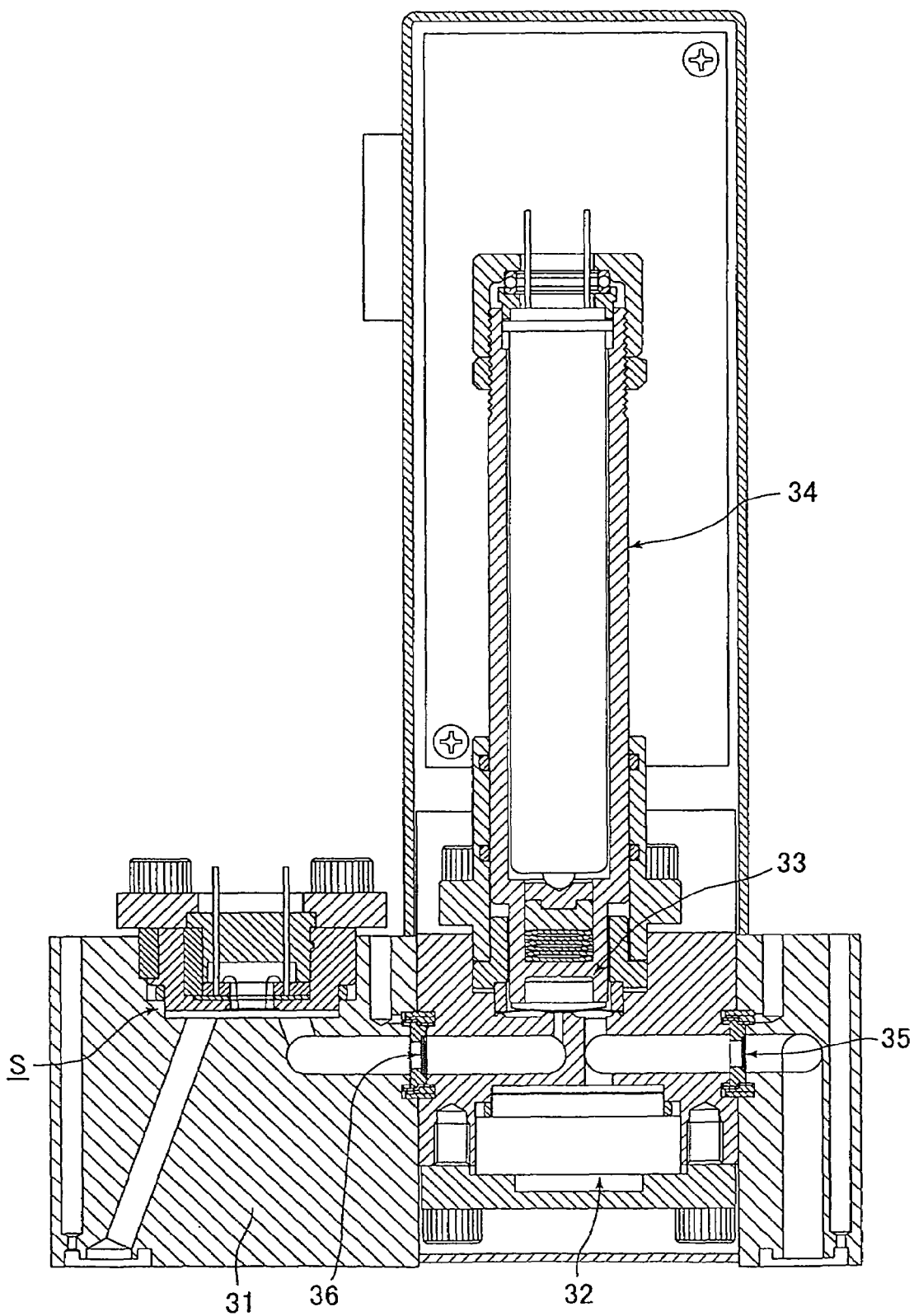
FIG. 16 is a sectional view to illustrate the other example of the assembly drawing of a mass flow rate sensor according to the present invention.

FIG. 16 illustrate a mass flow rate sensor S according to the present invention being assembled into the main body part of the pressure type flow rate control device. With FIG. 16, S designates a mass flow rate sensor, 31 a body, 32 a pressure detector, 33 a control valve, 34 a piezo-electric valve driving device, 35 an orifice, and 36 a filter.

Figure 17:
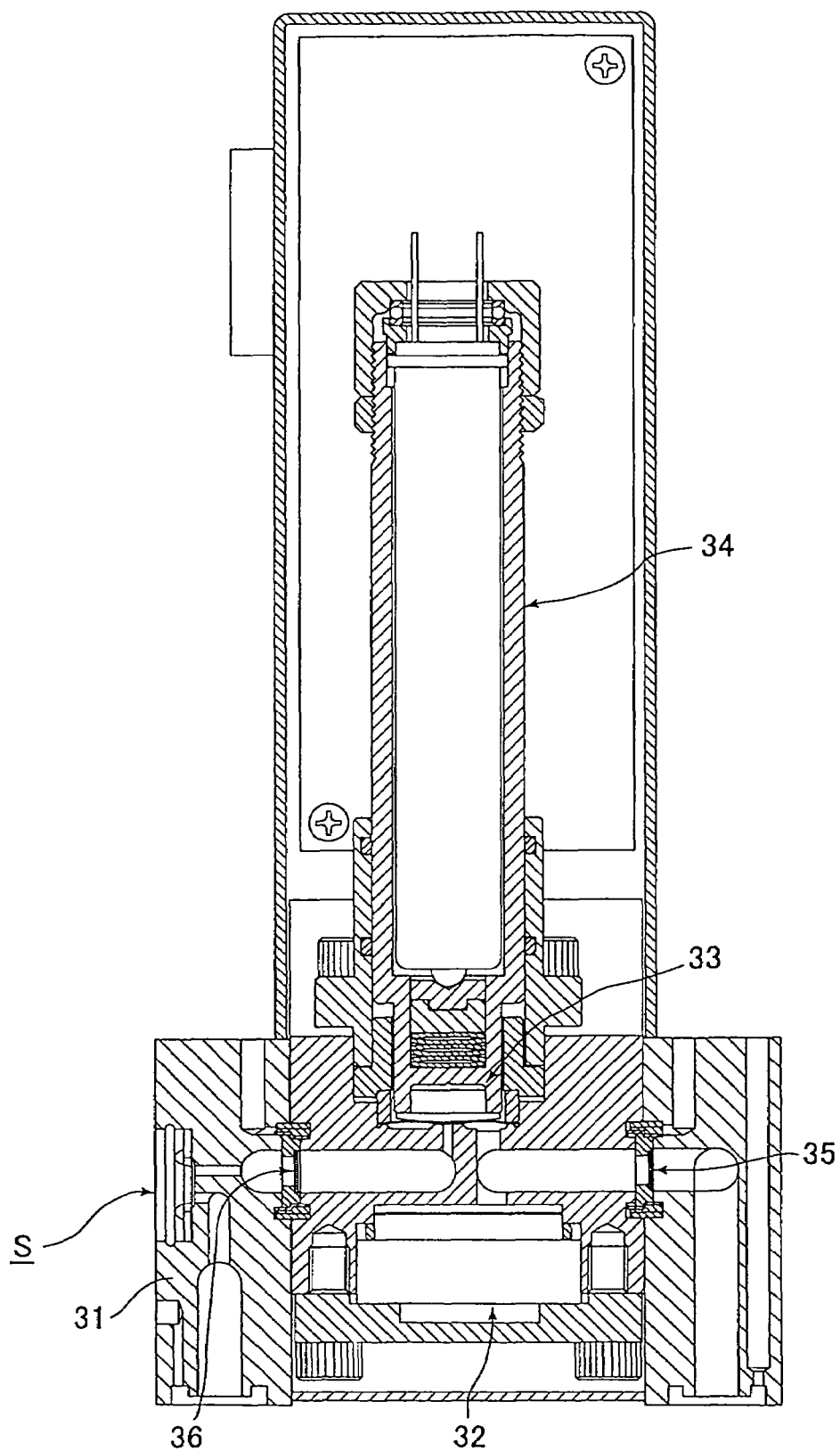
FIG. 17 is a sectional view to illustrate another example of the assembly drawing of a mass flow rate sensor according to the present invention.
Figure 18:
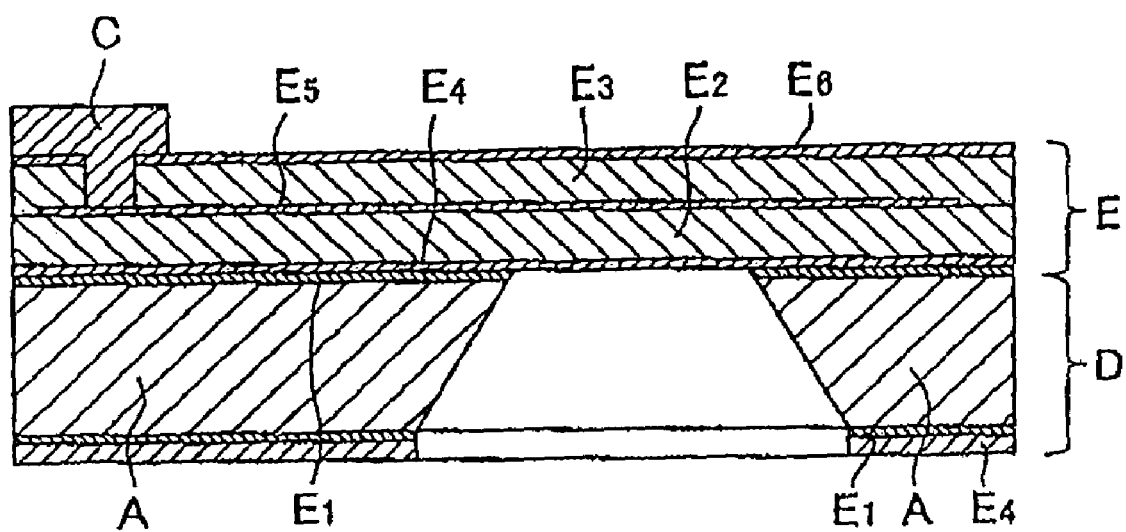
FIG. 18 is a sectional view to illustrate an outline of the conventional silicon-made ultra-small-sized thermal type mass flow rate sensor.

FIG. 17 illustrates a mass flow rate sensor S according to the present invention wherewith the assembling position is altered. Therefore, FIG. 17 is substantially identical to FIG. 16.

The constitutions of a pressure type flow rate control device and its main body part are publicly known, for instance, by U.S. Pat. No. 3,291,161, the TOKU-KAI-HEI No. 11-345027 and the like. Therefore, the explanation is omitted herewith.

EFFECTS OF THE INVENTION

According to the present invention, a substrate 2 to form the gas contacting parts of the resistance type mass flow rate sensor is made from a corrosion resistant material, and it is so constituted that temperature detecting resistances 3a, 3b and a heater 4 are formed to be thin-film-like by making use of micro-machine technologies.

Accordingly, the corrosion resistance of the gas contacting part is enhanced, and, at the same time, uniformity and compactness of the product characteristics, better response speed by decreasing the thermal capacity, being particle-free and the like are all achieved. As stated above, the present invention achieves excellent, practical effects when in use not only with semiconductor manufacturing facilities but also with chemical plant-related facilities.

The invention claimed is:

1. A corrosion resistant metal made thermal type mass flow rate sensor comprising:
   (a) a sensor part comprising
      i. a corrosion resisting metal substrate having a fluid contacting surface,
   wherein the corrosion resisting metal substrate comprises an outer peripheral part and a central part, wherein the central part comprises a thin plate that has a thickness that is less than the thickness of the outer peripheral part;
      ii. a thin film forming a temperature sensor; and
      iii. a heater mounted on a rear face side of the fluid contacting surface of the corrosion resistant metal substrate;
   (b) a sensor base equipped with the sensor part installed thereupon to secure hermeticity, and the corrosion resistant metal substrate is fastened hermetically to the sensor base, wherein the thin film comprises i. an insulation film formed on the rear face side of the fluid contacting surface of the corrosion resistant metal substrate;
ii. a metal film forming the temperature sensor on the insulation film;
iii. the heater formed on the insulation film; and
iv. a protection film disposed to cover the insulation film and the metal film.

2. A corrosion resistant metal made thermal type mass flow rate sensor as claimed in claim 1, further comprising:
a fluid inlet for fluids flowing in;
a fluid outlet for fluids flowing out;
a body, wherein the sensor part fits into the body; and
a metal gasket fastened to the sensor base; wherein
the body comprises a flow passage formed therein for communicating between, and connecting, the fluid inlet and the fluid outlet; and strain applied to the sensor part when fastening the metal gasket to the sensor base is suppressed by a stiffness of material of the sensor base against which the metal gasket fastens to secure hermeticity between the sensor base and the body.

3. A corrosion resistant metal made thermal type mass flow rate sensor as claimed in claim 2, wherein the corrosion resistant metal substrate is formed with thickness of less than 150 μm.

4. A fluid supply device comprising a corrosion resistant metal made thermal type mass flow rate sensor as claimed in claim 2, wherein the corrosion resistant metal made thermal type mass flow rate sensor is mounted on a fluid controller to check flow rate appropriately at the time of fluid control.

5. A corrosion resistant metal made thermal type mass flow rate sensor as claimed in claim 1, wherein the corrosion resistant metal substrate is formed with thickness of less than 150 μm.

6. A fluid supply device comprising a corrosion resistant metal made thermal type mass flow rate sensor as claimed in claim 5, wherein the corrosion resistant metal made thermal type mass flow rate sensor is mounted on a fluid controller to check flow rate appropriately at the time of fluid control.

7. A fluid supply device comprising a corrosion resistant metal made thermal type mass flow rate sensor as claimed in claim 1, wherein the corrosion resistant metal made thermal type mass flow rate sensor is mounted on a fluid controller to check flow rate appropriately at the time of fluid control.

8. A corrosion resistant metal made thermal type mass flow rate sensor as claimed in claim 1, wherein the insulation film is an oxidized film with a thickness of 1.2 μm to 1.8 μm.

9. A corrosion resistant metal made thermal type mass flow rate sensor as claimed in claim 1, wherein the temperature sensor comprises a plurality of temperature detecting resistances formed by the metal film comprising a Cr/Pt/Cr film.

10. A corrosion resistant metal made thermal type mass flow rate sensor as claimed in claim 9, wherein the heater is formed by a metal film comprising a Cr/Pt/Cr film.

11. A corrosion resistant metal made thermal type mass flow rate sensor as claimed in claim 1, wherein the protection film is a $SiO_2$ film that is 0.4 μm to 0.7 μm thick.

12. A corrosion resistant metal made thermal type mass flow rate sensor as claimed in claim 1, wherein the outer peripheral part of the sensor part is fixed into a flat fitting groove on a bottom surface of the sensor base.

13. A corrosion resistant metal made thermal type mass flow rate sensor comprising:
(a) a sensor part comprising
   i. a corrosion resisting metal substrate having a fluid contacting surface;
   ii. a thin film forming a temperature sensor; and
   iii. a heater mounted on a rear face side of the fluid contacting surface of the
(b) corrosion resistant metal substrate;
(c) a fluid inlet for fluids flowing in;
(d) a fluid outlet for fluids flowing out;
(e) a body, wherein the sensor part fits into the body; and
(f) a metal gasket fastened to the sensor base; wherein
the body comprises a flow passage formed therein for communicating between, and connecting, the fluid inlet and the fluid outlet; and strain applied to the sensor part when fastening the metal gasket to the sensor base is suppressed by a stiffness of material of the sensor base against which the metal gasket fastens to secure hermeticity between the sensor base and the body.

14. A corrosion resistant metal made thermal type mass flow rate sensor as claimed in claim 13, wherein the thin film comprises
an insulation film formed on the rear face side of the fluid contacting surface of the corrosion resistant metal substrate;
a metal film forming the temperature sensor on the insulation film;
a heater formed on the insulation film; and
a protection film disposed to cover the insulation film and the metal film.

15. A fluid supply device comprising a corrosion resistant metal made thermal type mass flow rate sensor as claimed in claim 14, wherein the corrosion resistant metal made thermal type mass flow rate sensor is mounted on a fluid controller to check flow rate appropriately at the time of fluid control.

16. A fluid supply device comprising a corrosion resistant metal made thermal type mass flow rate sensor as claimed in claim 13, wherein the corrosion resistant metal made thermal type mass flow rate sensor is mounted on a fluid controller to check flow rate appropriately at the time of fluid control.

* * * * *